(12) United States Patent
Lee et al.

(10) Patent No.: US 11,734,852 B2
(45) Date of Patent: Aug. 22, 2023

(54) SLOPE ESTIMATING APPARATUS AND OPERATING METHOD THEREOF

(71) Applicant: Samsung Electronics Co., Ltd., Suwon-si (KR)

(72) Inventors: Jaewoo Lee, Hwaseong-si (KR); Sangjun Lee, Suwon-si (KR); Wonju Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 148 days.

(21) Appl. No.: 17/334,149

(22) Filed: May 28, 2021

(65) Prior Publication Data

US 2021/0374976 A1 Dec. 2, 2021

(30) Foreign Application Priority Data

Jun. 1, 2020 (KR) ......................... 10-2020-0066066

(51) Int. Cl.
*G06T 7/73* (2017.01)
*G06T 7/269* (2017.01)
(Continued)

(52) U.S. Cl.
CPC ............. *G06T 7/73* (2017.01); *G06T 7/269* (2017.01); *G06T 7/60* (2013.01); *G06V 10/243* (2022.01);
(Continued)

(58) Field of Classification Search
CPC ...... G06V 20/588; G06V 10/44; G06V 20/58; G06V 10/764; G06V 10/243;
(Continued)

(56) References Cited

U.S. PATENT DOCUMENTS 6,546,118 B1 * 4/2003 Iisaka .................. G06V 20/588
382/104
8,090,152 B2 1/2012 Kageyama et al.
(Continued)

FOREIGN PATENT DOCUMENTS

JP 3580475 B2 * 10/2004 ......... G06K 9/00798
JP 3780848 B2 * 5/2006 ......... G06K 9/00798
(Continued)

OTHER PUBLICATIONS

Single camera lane detection and tracking—2005 (Year: 2005).*
(Continued)

*Primary Examiner* — Nizar N Sivji
(74) *Attorney, Agent, or Firm* — Harness, Dickey & Pierce, P.L.C.

(57) ABSTRACT

An operating method of a slope estimating apparatus is provided. The operating method of the slope estimating apparatus including at least one camera includes obtaining a forward image through the at least one camera, detecting a lane included in the forward image, dividing the forward image into a plurality of smaller regions in a horizontal direction, identifying a plurality of lane segments included in each of the plurality of smaller regions, obtaining a plurality of coordinate values forming each of the plurality of lane segments, and obtaining a pitch angle of each of the plurality of smaller regions based on the obtained plurality of coordinate values.

17 Claims, 14 Drawing Sheets

(51) Int. Cl.
*G06T 7/60* (2017.01)
*G06V 20/58* (2022.01)
*G06V 20/56* (2022.01)
*G06V 10/24* (2022.01)
*G06V 10/764* (2022.01)
*G06V 10/20* (2022.01)

(52) U.S. Cl.
CPC .......... *G06V 10/255* (2022.01); *G06V 10/764* (2022.01); *G06V 20/58* (2022.01); *G06V 20/588* (2022.01); *G06T 2207/30256* (2013.01)

(58) Field of Classification Search
CPC ....... G06V 10/255; G06T 7/246; G06T 7/269; G06T 7/60; G06T 2207/30256; G06T 2207/10016; G06T 2207/20021; G06T 2207/20084; G06T 2207/30244; G06T 7/73; G06T 2207/20081; G06T 7/11; G06K 9/6268; G06N 3/0445; G06N 3/0454; G06N 3/08
See application file for complete search history.

(56) References Cited

U.S. PATENT DOCUMENTS

| | | | |
|---|---|---|---|
| 8,310,545 B2 | 11/2012 | Fujita et al. | |
| 9,098,885 B2 | 8/2015 | Shechtman et al. | |
| 9,519,954 B2 | 12/2016 | Shechtman et al. | |
| 9,582,867 B2 | 2/2017 | Suhr et al. | |
| 9,987,898 B2 | 6/2018 | Deigmoller et al. | |
| 10,127,662 B1 | 11/2018 | Reicher et al. | |
| 10,300,854 B2 | 5/2019 | Lee | |
| 10,380,434 B2 | 8/2019 | Gor et al. | |
| 2005/0169530 A1* | 8/2005 | Nakai | G08G 1/166 382/104 |
| 2008/0239076 A1* | 10/2008 | Luo | G06V 20/584 348/148 |
| 2009/0041337 A1 | 2/2009 | Nakano | |
| 2009/0296987 A1* | 12/2009 | Kageyama | G06V 20/588 382/103 |
| 2012/0327188 A1* | 12/2012 | Takemura | G06V 20/588 348/148 |
| 2013/0141580 A1* | 6/2013 | Stein | G06V 20/58 348/148 |
| 2015/0165973 A1* | 6/2015 | Takemae | G06V 20/588 348/148 |
| 2016/0014394 A1* | 1/2016 | Suhr | H04N 13/239 348/43 |
| 2016/0335508 A1* | 11/2016 | Gor | G06V 20/588 |
| 2020/0117920 A1* | 4/2020 | Lee | G06T 7/536 |
| 2020/0125862 A1 | 4/2020 | Lee et al. | |

FOREIGN PATENT DOCUMENTS

| | | | | |
|---|---|---|---|---|
| JP | 4779202 B2 * | 9/2011 | | |
| KR | 101472787 B1 * | 12/2014 | | |
| KR | 10-2018-0024783 A | 3/2018 | | |
| KR | 10-2018-0065758 A | 6/2018 | | |
| KR | 10-2018-0089812 A | 8/2018 | | |
| KR | 10-2020-0045693 A | 5/2020 | | |
| WO | WO-2008130233 A1 * | 10/2008 | ......... G06K 9/00798 |

OTHER PUBLICATIONS

Simultaneous Estimation of Vehicle Dynamics and Lane Features for Road Safety Applications—2009 (Year: 2009).*
Efficient Lane Boundary Detection with Spatial-Temporal Knowledge Filtering—2016 (Year: 2016).*
Driving Environment Perception Using Stereovision—2005 (Year: 2006).*
A Novel Strategy for Road Lane Detection and Tracking Based on a Vehicle's Forward Monocular Camera—2019 (Year: 2019).*
Akihiro Watanabe IEEE Published Document Lane detection with roadside structure using on-board monocular camera 2009 (Year: 2009).*
Wedel, Andreas et al. "B-Spline Modeling of Road Surfaces With an Application to Free-Space Estimation," *IEEE Transactions on Intelligent Transportation Systems*, vol. 10, No. 4 (Dec. 2009): 572-583.
Lee et al., "Temporally Consistent Road Surface Profile Estimation Using Stereo Vision" IEEE Transactions on Intelligent Transportation Systems, p. 1-11, 2018.

* cited by examiner

Vertical Road Profile Estimation (dW: 5m)

SLOPE ESTIMATING APPARATUS AND OPERATING METHOD THEREOF

CROSS-REFERENCE TO RELATED APPLICATION

This application claims the benefit of Korean Patent Application No. 10-2020-0066066, filed on Jun. 1, 2020, in the Korean Intellectual Property Office, the disclosure of which is incorporated herein in its entirety by reference.

BACKGROUND

The inventive concepts relate to an apparatus for estimating a slope of a forward lane and an operating method of the apparatus, and more particularly, to an apparatus for estimating a slope of a forward road based on an image obtained through a camera and an operating method of the apparatus.

Image photographing devices using an image sensor may be included in various types of electronic devices such as smartphones, personal computers (PCs), surveillance cameras, and vehicles, or may each be used as one independent electronic device.

In self-driving-enabled vehicles, a distance to a peripheral vehicle may be recognized through an image sensor, and based thereon, stable driving may be performed by controlling a vehicle. However, conventional distance recognition on a forward target includes the assumption where a driving vehicle and a peripheral vehicle of a forward region are placed on the same plane, and due to this, has a problem where it is difficult to apply the conventional distance recognition to a road having a slope such as an uphill road or a downhill road.

Also, an environment where a vehicle is actually driving may include an environment which is driving on a curved road, in addition to an environment which is driving on a straight road. On curved roads, a vanishing point may not be defined as one point, and due to this, there is a problem where it is unable to estimate a pitch angle of a driving vehicle based on the vanishing point.

SUMMARY

The inventive concepts provide an apparatus for estimating a slope of a forward road by horizontally dividing an image obtained through at least one camera and an operating method of the apparatus.

According to an aspect of the inventive concepts, there is provided an operating method of a slope estimating apparatus including at least one camera, the operating method including obtaining a forward image through the at least one camera, detecting a lane included in the forward image, dividing the forward image into a plurality of smaller regions in a horizontal direction, identifying a plurality of lane segments included in each of the plurality of smaller regions, obtaining a plurality of coordinate values forming each of the plurality of lane segments, and obtaining a pitch angle of each of the plurality of smaller regions based on the obtained plurality of coordinate values.

According to another aspect of the inventive concepts, there is provided a slope estimating apparatus including at least one camera configured to obtain a forward image where a host vehicle including the slope estimating apparatus is driving and an image signal processor configured to detect a lane included in the forward image, divide the forward image into a plurality of smaller regions in a horizontal direction, identify a plurality of lane segments included in each of the plurality of smaller regions, obtain a plurality of coordinate values forming each of the plurality of lane segments, and obtain a pitch angle of each of the plurality of smaller regions based on the obtained plurality of coordinate values.

According to another aspect of the inventive concepts, there is provided a host vehicle apparatus including at least one camera configured to obtain a forward image where a host vehicle is driving, an image signal processor configured to detect a lane included in the forward image, divide the forward image into a plurality of smaller regions in a horizontal direction, identify a plurality of lane segments included in each of the plurality of smaller regions, obtain a plurality of coordinate values forming each of the plurality of lane segments, obtain a pitch angle of each of the plurality of smaller regions based on the obtained plurality of coordinate values, identify a plurality of smaller regions from a lower end of the forward image, identify a lane segment included in each of the plurality of smaller regions, obtain a pitch angle corresponding to each of the plurality of smaller regions based on a plurality of coordinate values forming the identified lane segment, and convert coordinates of the forward image into a coordinate value of a world coordinate based on the obtained pitch angle, and a vehicle controller configured to control strength of a suspension and/or a speed of the host vehicle based on the coordinate value of the world coordinate.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, example embodiments will be described in detail with reference to the accompanying drawings. Before providing a detailed description, the terms will be described below.

A host vehicle may denote a vehicle including a slope estimating apparatus according to example embodiments. The slope estimating apparatus may be electrically or physically connected to the host vehicle. The slope estimating apparatus may be embedded into the host vehicle, or may be attached on the outside of the host vehicle. The host vehicle may be referred to as various terms including an ego-vehicle, a self-vehicle, and an autonomous driving vehicle.

An image plane may denote a two-dimensional (2D) region where the real world is projected through a camera of a distance estimating apparatus. For example, when the camera is a pinhole camera, the real world may be projected in a state where an upper portion and a lower portion are reversed therebetween and a left portion and a right portion are reversed therebetween, and thus, may be displayed as an image plane phase.

An image plane may be a 2D region, and thus, may include a coordinate divided by pixel units. The coordinate may be referred to as an image coordinate. For example, when a left upper end of an image plane is set to an origin, a right direction may be expressed as a u axis, and a downward direction may be expressed as a v axis.

A world coordinate may denote a coordinate for expressing the real world corresponding to an external environment of the camera of the distance estimating apparatus. According to some example embodiments, when the camera of the slope estimating apparatus is set to an origin, the world coordinate may be referred to as a camera coordinate. The camera coordinate or the world coordinate, where the camera of the slope estimating apparatus is set to the origin, may have an X axis, a Y axis, and a Z axis. For example, the X axis may correspond to a forward direction in which the camera focuses, the Y axis may correspond to a left direction with respect to a front of the camera, and the Z axis may correspond to an upward direction with respect to the front of the camera. In other words, a Z axis (hereinafter referred to as a $Z_C$ axis) of the camera coordinate may correspond to an X axis of the world coordinate, a Y axis (hereinafter referred to as a $Y_C$ axis) of the camera coordinate may correspond to a Z axis of the world coordinate, and an X axis (hereinafter referred to as an $X_C$ axis) of the camera coordinate may correspond to a Y axis of the world coordinate.

Figure 1:
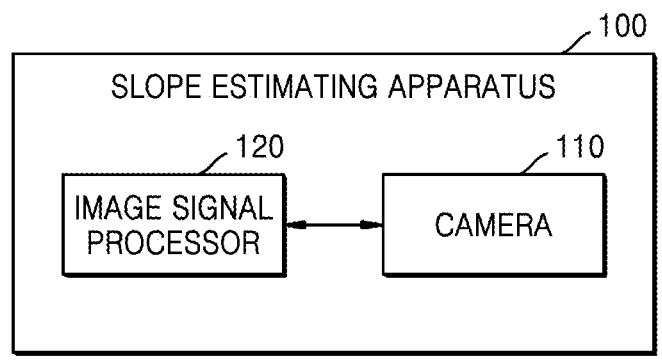
FIG. 1 is a block diagram of a slope estimating apparatus according to example embodiments.

A road coordinate may denote a virtual coordinate for calculating a slope of an arbitrary region placed on a forward road. For example, the road coordinate may correspond to the world coordinate where two different points are disposed on an X axis and a camera is disposed on a Z axis, with respect to the two different points placed on a forward road. FIG. 1 is a block diagram of a slope estimating apparatus 100 according to example embodiments.

Referring to FIG. 1, the slope estimating apparatus 100 may include a camera 110 and an image signal processor (ISP) 120.

The camera 110 may be embedded into a host vehicle and may recognize an external environment of the host vehicle. For example, the camera 110 may convert light, corresponding to an external environment in a forward direction or various directions, into electrical energy to generate an image and may transfer the generated image to the ISP 120.

The camera 110 may be embedded into an electronic device, or may be implemented as an electronic device. An electronic device may be implemented as, for example, a personal computer (PC), an Internet of things (IoT) device, or a portable electronic device. Portable electronic devices may include laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, etc.

The ISP 120 may detect a lane of a forward road and may obtain a pitch angle and a vertical height of a forward road, based on an image (hereinafter referred to as a forward image) obtained through the camera 110. The pitch angle may denote an elevation angle with respect to a plane which supports a host vehicle. For example, the pitch angle may be referred to as various terms such as an elevation angle and a pitch angle. The vertical height may denote a distance which is isolated in a vertical direction from a plane which supports the host vehicle. An operation of obtaining the pitch angle and the vertical height will be described below.

The ISP 120 may divide the forward image into a plurality of smaller (for example, predefined) regions. For example, the ISP 120 may divide the forward image into the plurality of smaller regions in a horizontal direction. One of the divided plurality of smaller regions may include a portion of the detected lane. The portion of the lane included in the one smaller region may be referred to as a lane segment. For example, a first region may include an image of a first lane segment, and a second region may include an image of a second lane segment. When the first region and the second region are adjacent to each other in a vertical direction, the first lane segment and the second lane segment may be connected as one line.

The ISP 120 may estimate a pitch angle corresponding to one smaller region based on a lane segment included in each of the plurality of smaller regions. For example, the ISP 120 may estimate a slope of a divided region by using homography and a road coordinate. The homography may denote an algorithm for conversion between 2D and three-dimensional (3D). An operation of estimating a slope by using the ISP 120 will be described below in detail.

Figure 2:
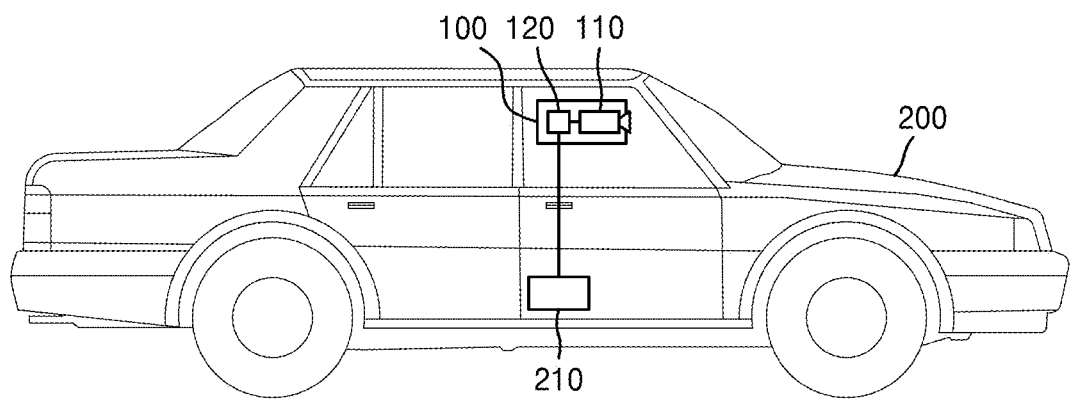
FIG. 2 is a side view of a host vehicle including a slope estimating apparatus according to example embodiments.

FIG. 2 is a side view of a host vehicle 200 including a slope estimating apparatus according to example embodiments. Description which is the same as or similar to the description of FIG. 1 is omitted.

Referring to FIGS. 1 and 2, the host vehicle 200 may include a slope estimating apparatus 100 and a vehicle controller 210.

The vehicle controller 210 may control the overall driving of the host vehicle 200. The vehicle controller 210 may obtain a pitch angle of an arbitrary point on a forward road and distance information about a distance to the arbitrary point from the slope estimating apparatus 100. For example, the arbitrary point may correspond to a point where a speed bump is provided. The vehicle controller 210 may decrease a speed of the host vehicle 200 in a direction closer to the speed bump based on distance information about a distance to the speed bump. To this end, the vehicle controller 210 may generate a control signal indicating deceleration and may transfer the control signal to a brake system. Also, the vehicle controller 210 may increase the strength of a suspension at a time at which the host vehicle 200 passes through the speed bump. The suspension may be a device which connects a wheel and a chassis of the host vehicle 200 and may be a device for absorbing an impact from a road surface. The vehicle controller 210 may increase the strength of the suspension at a time at which the host vehicle 200 passes through the speed bump, and thus, may decrease a vertical motion of a passenger and may provide stable riding quality.

Any of the elements disclosed herein may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Figure 3:
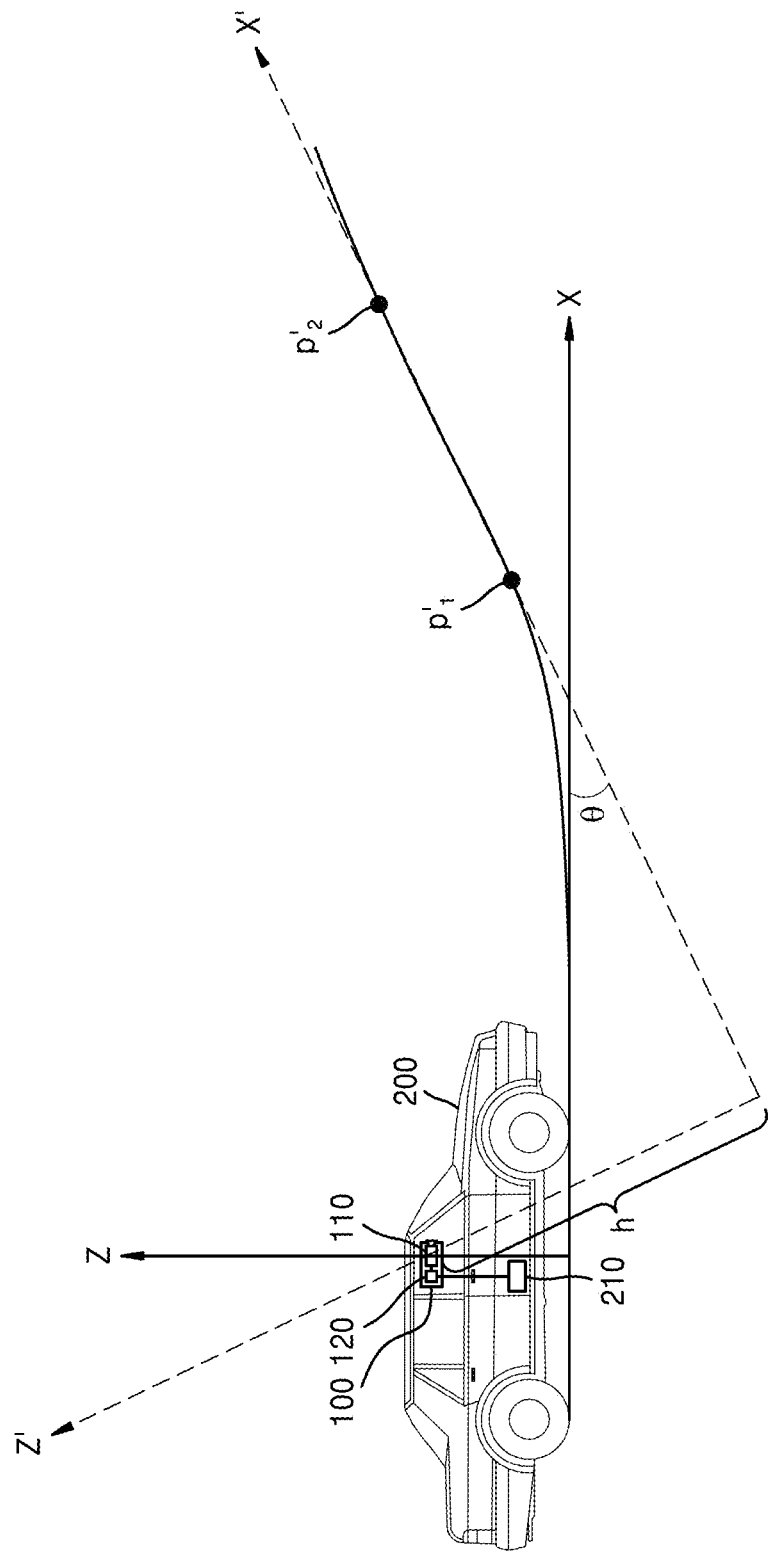
FIG. 3 illustrates an example of a road coordinate according to example embodiments.

FIG. 3 illustrates an example of a road coordinate according to example embodiments.

Referring to FIG. 3, a host vehicle 200 may be driving along a forward lane, and FIG. 3 may correspond to a side view of a driving situation. Referring to FIG. 3, an uphill road may be in a front view with respect to the host vehicle 200. Two points on the uphill road of the front view may be referred to as a first point $p'_1$ and a second point $p'_2$, respectively. Z-axis components of the first point $p'_1$ and the second point $p'_2$ may have different values. That is, in a world coordinate, vertical heights of the first point $p'_1$ and the second point $p'_2$ may differ.

According to some example embodiments, a road coordinate where the first point $p'_1$ and the second point $p'_2$ are on a flat surface may be assumed. In the road coordinate, the Z-axis (hereinafter referred to as a Z' axis) components of the first point $p'_1$ and the second point $p'_2$ may each correspond to 0. That is, the first point $p'_1$ and the second point $p'_2$ may be on an X-axis (hereinafter referred to as an X' axis) of the road coordinate. Also, it may be assumed that a camera 110 is on the Z' axis of the road coordinate. That is, in the road coordinate, an X'-axis component of the camera 110 may be 0.

A world coordinate of the first point $p'_1$ may be $(X_1, Y_1, Z_1)$, and a road coordinate of the first point $p'_1$ may be $(X'_1, Y'_1, 0)$. A world coordinate of the second point $p'_2$ may be $(X_2, Y_2, Z_2)$, and a road coordinate of the second point $p'_2$ may be $(X'_2, Y'_2, 0)$.

As described above, it may be seen that a camera coordinate is expressed with respect to a world coordinate, and moreover, a road coordinate is elevated by a pitch angle with respect to the world coordinate. Therefore, the camera coordinate may be expressed with respect to the road coordinate. A correlation between the camera coordinate and the road coordinate may be expressed as the following Equation 1.

$$\begin{bmatrix} X_C \\ Y_C \\ Z_C \end{bmatrix} = \begin{bmatrix} 0 & -1 & 0 \\ -\sin\theta & 0 & -\cos\theta \\ \cos\theta & 0 & -\sin\theta \end{bmatrix} \cdot \begin{bmatrix} X' \\ Y' \\ Z' \end{bmatrix} + \begin{bmatrix} 0 \\ h\cdot\cos\theta \\ h\cdot\sin\theta \end{bmatrix} \quad \text{[Equation 1]}$$

In an embodiment, h may denote an interval between a camera and an X' axis on the road coordinate, namely, may correspond to a Z'-axis component value of the camera in the road coordinate, and θ may correspond to a pitch angle representing the degree of elevation of the road coordinate with respect to the world coordinate.

An object in the camera coordinate may be projected through the camera 110, and thus, a forward image may include an image corresponding to the object. That is, the camera coordinate may be correlated to an image coordinate (or a pixel coordinate) for expressing an image plane. A correlation between the camera coordinate and the image coordinate may be expressed as the following Equation 2.

$$\begin{bmatrix} u \\ v \\ 1 \end{bmatrix} = \frac{1}{s} \cdot \begin{bmatrix} f_X & 0 & c_X \\ 0 & f_Y & c_Y \\ 0 & 0 & 1 \end{bmatrix} \cdot \begin{bmatrix} -Y' \\ -\sin\theta \cdot X' - \cos\theta \cdot Z' + h\cdot\cos\theta \\ \cos\theta \cdot X' - \sin\theta \cdot Z' + h\cdot\sin\theta \end{bmatrix} \quad \text{[Equation 2]}$$

In an embodiment, $f_X$ and $f_Y$ may each denote a focal length, and $c_X$ and $c_Y$ may each denote a principal point. Internal parameters $c_X$ and $c_Y$ of a camera may each have a predetermined or alternatively, desired value for correcting a movement displacement of a coordinate center in an image plane.

As described above, in the road coordinate, because the first point $p'_1$ and the second point $p'_2$ are assumed to be on a flat surface, Z' components of the first point $p'_1$ and the second point $p'_2$ may be 0. Therefore, when Z' is substituted into 0 in Equation 2, the following Equation 3 may be calculated.

$$X' \cdot (u\cdot\cos\theta - c_X\cdot\cos\theta) + Y'\cdot f_X = -u\cdot h\cdot\sin\theta + c_X\cdot h\cdot\sin\theta$$

$$X'\cdot(f_Y\cdot\sin\theta + v\cdot\cos\theta - c_Y\cdot\cos\theta) = -v\cdot h\cdot\sin\theta + f_Y\cdot h\cdot\cos\theta + c_Y\cdot h\cdot\sin\theta \quad \text{[Equation 3]}$$

In an embodiment, by performing approximation using the first-order Taylor series on Equation 3, an arbitrary point (X', Y') of the road coordinate may be expressed as the following Equation 4.

$$X'(\theta, h) = \frac{h \cdot (f_Y - (v - c_Y) \cdot \theta)}{f_Y \cdot \theta + (v - c_Y)} \quad \text{[Equation 4]}$$

$$Y'(\theta, h) = -h \cdot \theta \cdot (u - c_X) - \frac{h \cdot (f_Y - (v - c_Y) \cdot \theta) \cdot (u - c_X)}{f_Y \cdot \theta + (v - c_Y)}$$

Referring to Equation 4, the arbitrary point (X', Y') of the road coordinate may be expressed as coordinates (u, v) and a pitch angle each corresponding to the arbitrary point in the image coordinate and may be expressed as a camera height in the road coordinate.

Figure 4:
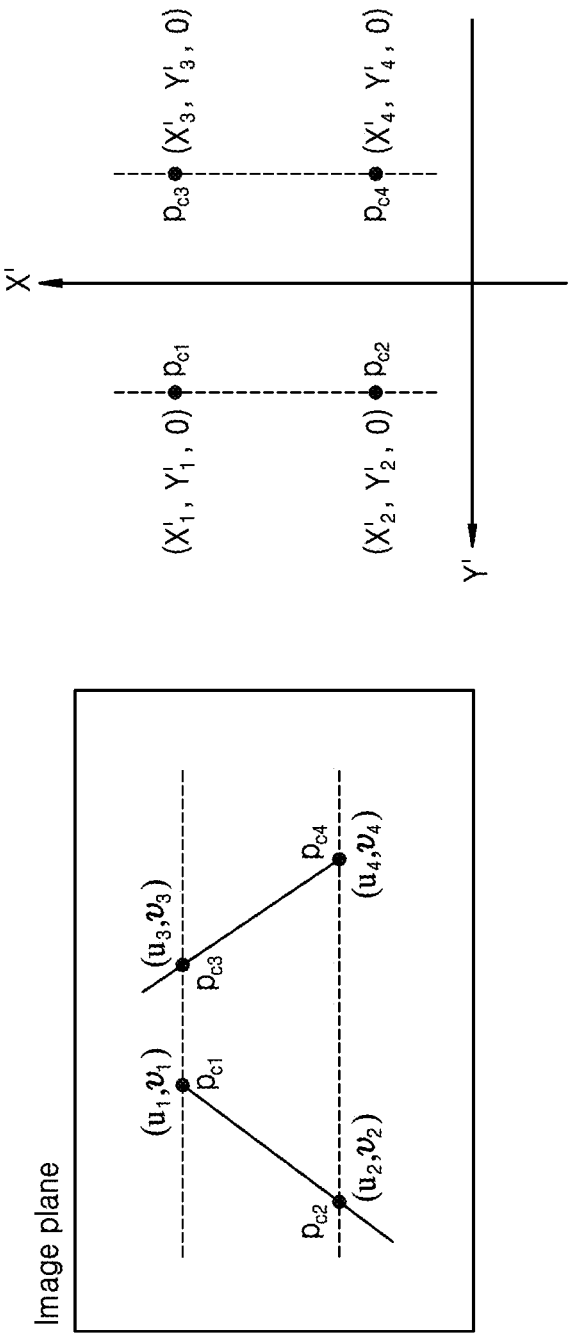
FIG. 4 illustrates a correlation between an image coordinate and a road coordinate, according to example embodiments.

FIG. 4 illustrates a correlation between an image coordinate and a road coordinate, according to example embodiments.

Referring to FIG. 4, a left image may correspond to an image plane. That is, the left image may correspond to an image which is seen through a camera 110 included in a slope estimating apparatus 100 in a host vehicle 200, which is driving on a road.

Referring to the image plane, it may be seen that two lines are not parallel to each other. Parallel lines in the world coordinate may not be parallel to each other like the two lines of the image plane and may face one point. The one point may be referred to as a vanishing point.

Two points having the same v component may be set from the two lines of the image plane. For example, when first coordinates are ($u_1$, $v_1$) and third coordinates are ($u_3$, $v_3$), $v_1$ and $v_3$ may have the same value. As another example, when second coordinates are ($u_2$, $v_2$) and fourth coordinates are ($u_4$, $v_4$), $v_2$ and $v_4$ may have the same value. That is, in the image plane, when two parallel virtual lines are drawn in a horizontal direction, four points intersecting with lines corresponding to a lane may be referred to as first to fourth coordinates, respectively.

According to some example embodiments, a right image may correspond to a bird's-eye view of a world coordinate. That is, the first to fourth coordinates may be points on a forward road, and thus, Z' components thereof may each be 0. When the first coordinates are converted into a world coordinate in an image plane on which a camera focuses, the first coordinates may be (X'1, Y'1, 0). The other second to fourth coordinates are as described above.

According to some example embodiments, a width of a lane where a host vehicle 200 is driving may be constant, and this may be identically applied to a curved road. That is, in the road coordinate, a Y' component difference between the third coordinates and the first coordinates may be the same as a Y' component difference between the fourth coordinates and the second coordinates. That is, assuming that a width of a lane is constant, the width of the lane may be expressed as the following Equation 5.

$$Y'_1(\theta, h) - Y'_3(\theta, h) = \qquad \text{[Equation 5]}$$
$$\frac{1}{f_X}\left\{h \cdot \theta \cdot (u_3 - u_1) + \frac{h \cdot (f_Y - (v_1 - c_Y) \cdot \theta) \cdot (u_3 - u_1)}{f_Y \cdot \theta + (v_1 - c_Y)}\right\}$$
$$Y'_2(\theta, h) - Y'_4(\theta, h) =$$
$$\frac{1}{f_X}\left\{h \cdot \theta \cdot (u_4 - u_2) + \frac{h \cdot (f_Y - (v_2 - c_Y) \cdot \theta) \cdot (u_4 - u_2)}{f_Y \cdot \theta + (v_2 - c_Y)}\right\}$$

In an embodiment, referring to Equation 5, a cubic equation corresponding to a pitch angle may be obtained, and the pitch angle may be expressed as the following Equation 6.

$$\therefore \theta = \frac{((u_1 - u_3) \cdot (v_2 - c_Y) - (u_2 - u_4) \cdot (v_1 - c_Y))}{((u_1 - u_3) - (u_2 - u_3)) \cdot f_Y} \qquad \text{[Equation 6]}$$

In an embodiment, u and v may denote coordinate values of the image plane, and $f_Y$ and $c_Y$ may denote values defined as internal parameters of a camera. That is, when coordinate values of four points, generated because two lines detected as a lane in a forward image of the image plane intersect with two lines which are parallel to each other in a horizontal direction, are identified, a pitch angle may be calculated.

Figure 5A:
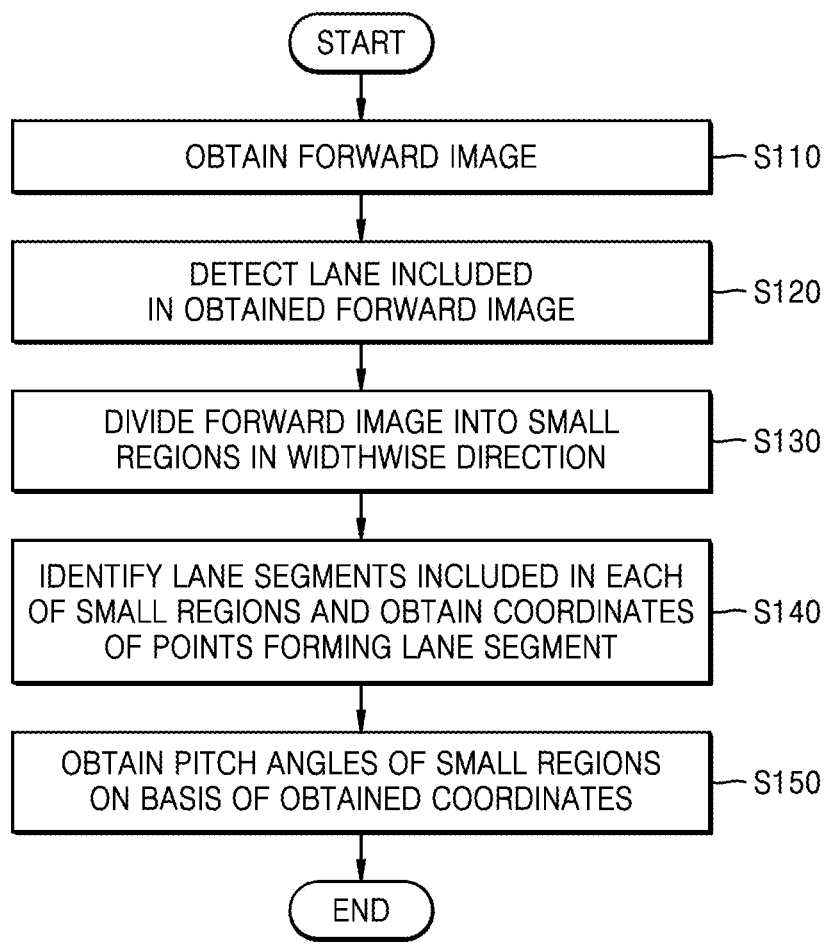
FIG. 5A is a flowchart illustrating an operating method of a slope estimating apparatus, according to example embodiments.

FIG. 5A is a flowchart illustrating an operating method of a slope estimating apparatus, according to example embodiments.

Referring to FIG. 5A, in operation S110, the ISP 120 may obtain a forward image. When the host vehicle 200 is driving along a road, the camera 110 may obtain an image (hereinafter referred to as a forward image) of a front view with respect to the host vehicle 200 and may transfer the obtained image to the ISP 120.

In operation S120, the ISP 120 may detect a lane included in the obtained forward image. The ISP 120 may execute an object detection algorithm on the obtained forward image.

For example, the ISP 120 may first filter yellow or white objects, and after the filtering, the ISP 120 may check whether a shape of each of the objects is a linear shape, thereby detecting only a lane. As another example, the host vehicle 200 may further include a neural network intellectual property (IP) based on artificial intelligence (AI). The neural network IP may include one or more accelerators and may quickly execute the object detection algorithm.

In some embodiments including those discussed below, the neural network IP may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively or additionally, such neural network IP may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

Figure 5B:
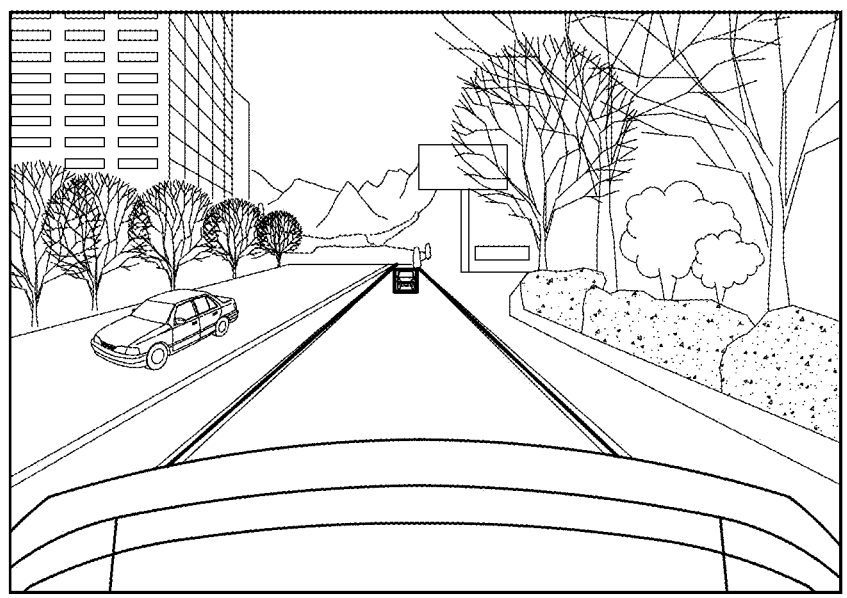
FIG. 5B illustrates an example of a result of detection of a forward lane and a forward image, according to example embodiments.
Figure 5B:
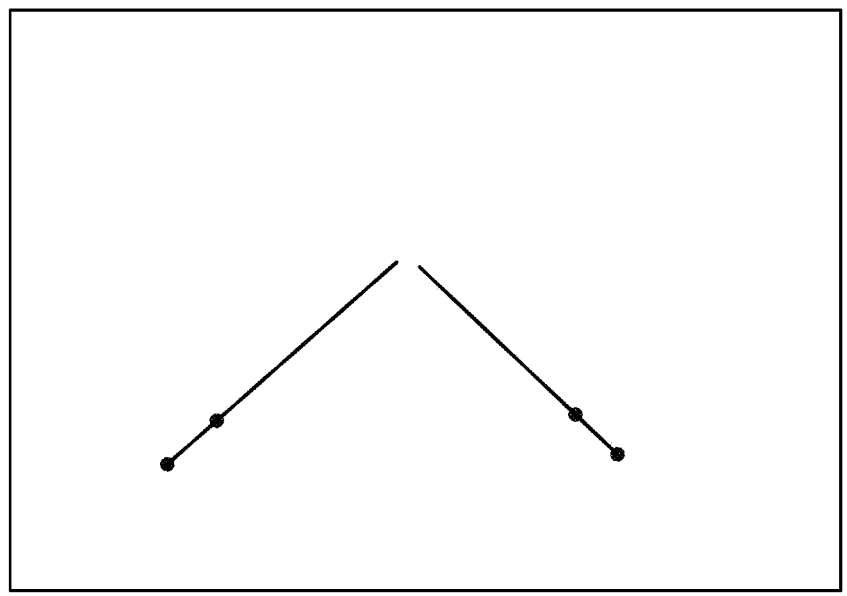

Referring to FIGS. 5A and 5B, an upper image may correspond to a forward image obtained through a camera, and a lower image may correspond to an image where lane detection is completed based on the object detection algorithm. Referring to the lower image, it may be checked that objects, including a vehicle driving in a front view, a building, and a tree except a lane, have been filtered.

Figure 5C:
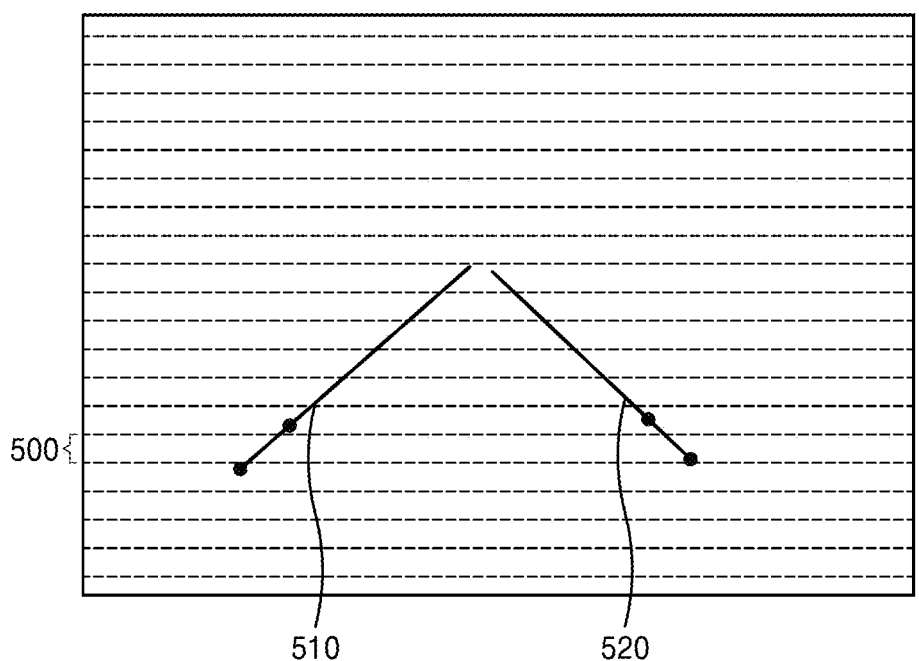
FIG. 5C illustrates an example where a forward image is divided into a plurality of smaller regions, according to example embodiments.

In operation S130, the ISP 120 may divide the forward image into a plurality of smaller regions in a horizontal direction. Referring to FIGS. 5A and 5C, the ISP 120 may divide a lane detection-completed forward image (hereinafter referred to as a lane detection image) into a plurality of smaller regions in a horizontal direction.

Referring to FIG. 5C, pixel lengths (hereinafter referred to as vertical pixel lengths) of the plurality of smaller regions in a vertical direction may be the same. That is, intervals between a plurality of points parallel to one another in the horizontal direction may be the same. For example, a pixel length may correspond to a 5-pixel length, but example embodiments are not limited thereto and a pixel length having a decimal point unit may be used. The vertical pixel length may flexibly vary based on the complexity of a forward image, a speed of the host vehicle 200, and an overload of the ISP 120.

According to some example embodiments, vertical pixel lengths of the plurality of smaller regions may differ. For example, the ISP 120 may decrease a vertical pixel length of each of a plurality of lower smaller regions of the forward image. That is, in a forward road at a distance close to the host vehicle 200, a pitch angle thereof may be more precisely measured, and thus, may be used as a pitch angle of the host vehicle 200. As another example, the ISP 120 may decrease a vertical pixel length of each of a plurality of upper smaller regions of the forward image. The upper smaller regions of the forward image may correspond to a region far away from the host vehicle 200. This is because, despite a region far away from the host vehicle 200, when a speed of the host vehicle 200 is greater than a threshold speed or a load of the ISP 120 is equal to or greater than a predetermined or alternatively, desired threshold value, it is needed to previously calculate a pitch angle before approaching the region.

Figure 5D:
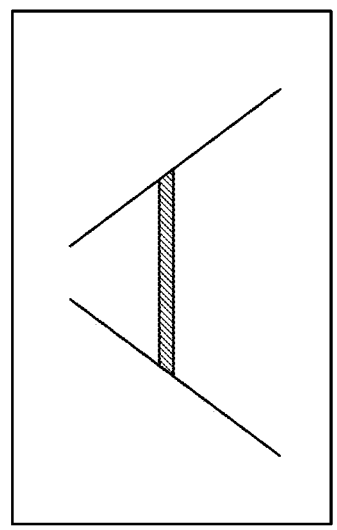
FIG. 5D illustrates a road coordinate and an image plane corresponding to one smaller region, according to example embodiments.
Figure 5D:
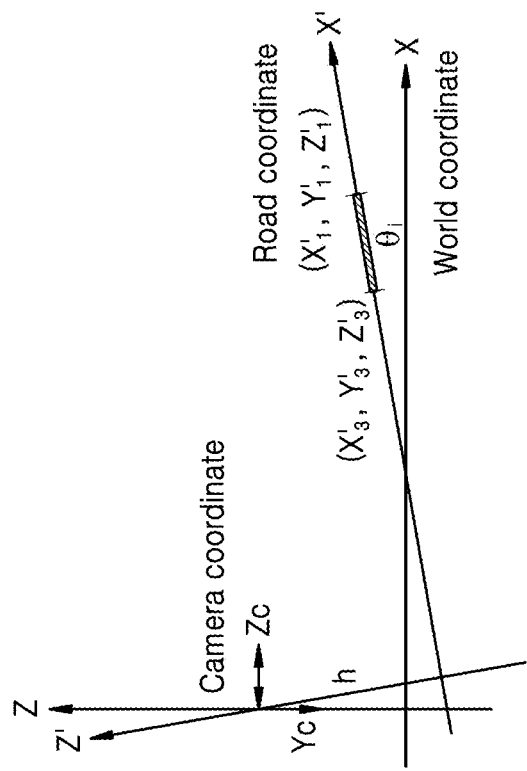

In operation S140, the ISP 120 may identify a lane segment included in each of the plurality of smaller regions and may obtain coordinates of points which form the lane segment. Referring to FIGS. 5A and 5D, a left image may represent one of the plurality of smaller regions.

The lane segment may correspond to at least a portion of the lane which is detected in operation S120. For example, in a case where the forward image is divided into the plurality of smaller regions in the horizontal direction, the lane which is detected in operation S120 may be divided into a plurality of lane segments. That is, a lane segment may denote a lane included in each of a plurality of smaller regions.

The ISP 120 may obtain coordinate values of points which form a lane segment. For example, referring to FIG. 5C, when one smaller region is a region 510, a lane segment may denote a plurality of lines 510 and 520. In an embodiment, a plurality of points forming the lane segment may include both end points of the left line 510 and both end points of the right line 520. That is, referring to FIG. 4, the plurality of points forming the lane segment may include first to fourth coordinates. The both end points forming the left line 510 may include the first coordinates ($u_1$, $v_1$) and the second coordinates ($u_2$, $v_2$), and the both end points forming the right line 520 may include the third coordinates ($u_3$, $v_3$) and the fourth coordinates ($u_4$, $v_4$).

In operation S150, the ISP 120 may obtain a pitch angle of each of the plurality of smaller regions based on the obtained coordinates.

The ISP 120 may obtain a pitch angle corresponding to an arbitrary smaller region based on the obtained coordinate values by using Equation 6. For example, referring to Equation 6, a pitch angle of the smaller region 510 of FIG. 5C may be calculated by inputting the first to fourth coordinates ($u_1$, $v_1$) to ($u_4$, $v_4$) included in the image plane and an internal parameter of the camera 110.

According to some example embodiments, the ISP 120 may calculate a pitch angle from each of the lower smaller regions of the forward image. Each of the lower smaller regions of the forward image may be a region corresponding to a distance close to the host vehicle 200, and thus, may be assumed to be a region of a flat road with respect to the host vehicle 200. Therefore, the ISP 120 may calculate the pitch angle of each of the lower smaller regions and may set the calculated pitch angle to a pitch angle of the host vehicle 200. Accordingly, the ISP 120 may reflect in real time the pitch angle of the host vehicle 200 in a driving process of the host vehicle 200.

Figure 6:
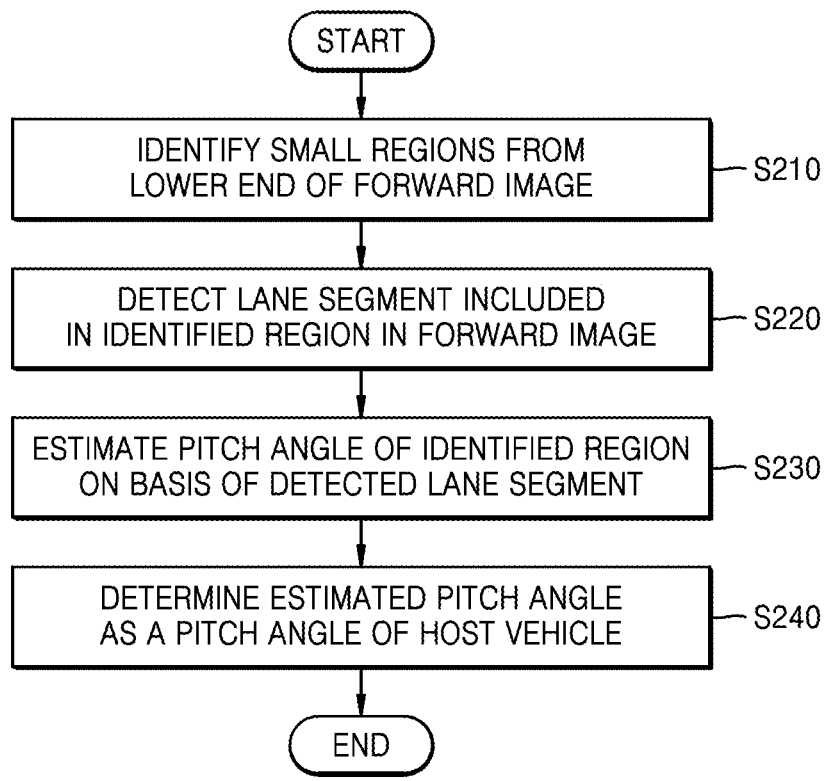
FIG. 6 illustrates a flowchart for measuring a pitch angle of a host vehicle, according to example embodiments.

FIG. 6 illustrates a flowchart for measuring a pitch angle of a host vehicle, according to example embodiments.

Referring to FIG. 6, the ISP 120 may identify a predetermined or alternatively, desired plurality of smaller regions from a lower end of a forward image. For example, the ISP 120 may identify five smaller regions from the lower end of the forward image. The predetermined or alternatively, desired number may flexibly vary based on a speed of the host vehicle 200 and an overload of the ISP 120.

That is, the ISP 120 may set at least some of a plurality of smaller regions, thereby enhancing the reliability of a pitch angle of a region close to the host vehicle 200. For example, a concave-convex portion may be on a forward road with respect to the host vehicle 200. For example, when the ISP 120 identifies only one smaller region and sets a calculated pitch angle to a pitch angle of the host vehicle 200, errors may occur. For example, this is because, when one identified smaller region is a region including a concave-convex portion, although a pitch angle of the host vehicle 200, which is driving, is 0, a pitch angle having a high value may be set to the pitch angle of the host vehicle 200. When a pitch angle of a wide region is set to the pitch angle of the host vehicle 200, despite a concave-convex portion partially provided on a forward road, a total pitch angle of the forward road may be set to the pitch angle of the host vehicle 200.

In operation S220, the ISP 120 may detect a lane segment included in an identified region of a forward image. The ISP 120 may detect a lane which is provided in a plurality of smaller regions. For example, a length of a lane segment of a region where a vertical pixel length is 1 may be short to represent a pitch angle of a forward road, but a length of a lane segment of a region where a vertical pixel length is 10 may be sufficiently long to represent the pitch angle of the forward road, In operation S230, the ISP 120 may estimate a pitch angle of an identified region based on the detected lane segment. That is, the ISP 120 may obtain four coordinate values forming the detected lane segment and may substitute the obtained coordinate values into Equation 6 to obtain a pitch angle of an identified region. Descriptions thereof are the same as or similar to the descriptions of operations S140 and S150 of FIG. 5A, and thus, are omitted.

Figure 7A:
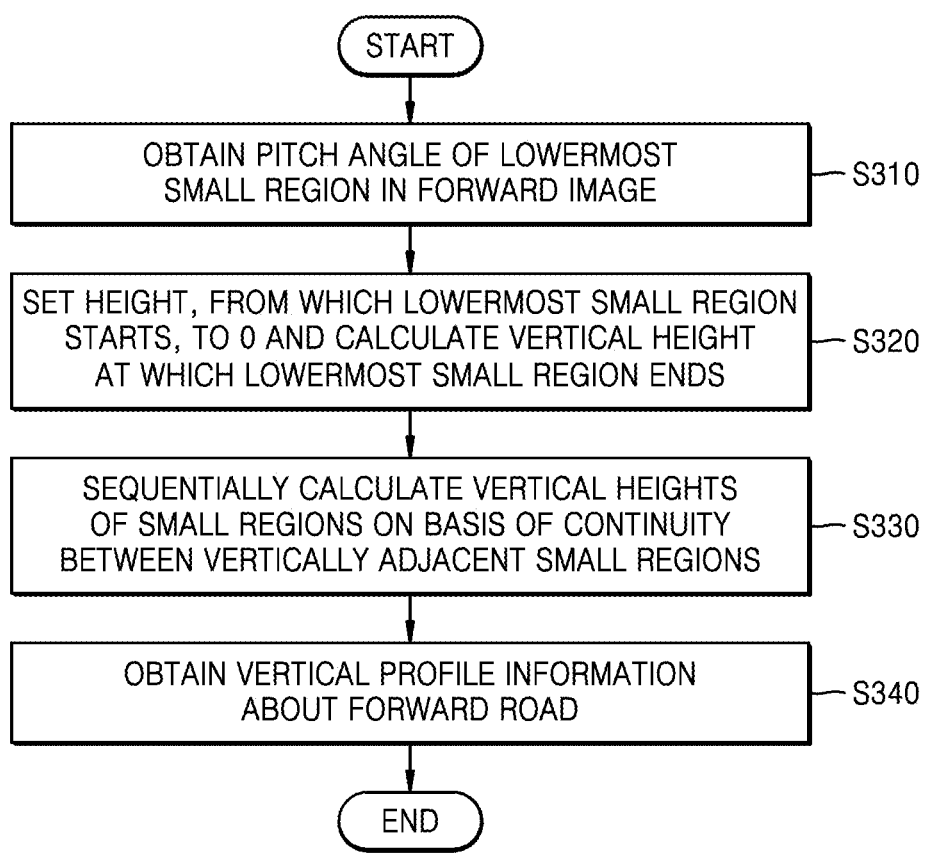
FIG. 7A illustrates a flowchart for generating a vertical road profile, according to example embodiments.

FIG. 7A illustrates a flowchart for generating a vertical road profile, according to example embodiments. The vertical road profile may denote information about a vertical height of a forward lane along which the host vehicle 200 is driving.

Referring to FIG. 7A, in operation S310, the ISP 120 may obtain a pitch angle of a lowermost smaller region of a forward image. For example, referring to FIG. 7A in conjunction with FIG. 7B, the lowermost smaller region may be a smaller region $h_0$. The lowermost smaller region may denote a smaller region closest to the host vehicle 200 among a plurality of smaller regions included in the forward image. It may be understood that the lowermost smaller region $h_0$ is a smaller region having the same vertical height as that of the host vehicle 200, which is driving. That is, the lowermost smaller region $h_0$ may denote a flat region with respect to a ground surface on which the host vehicle 200 is driving. A description of a process of obtaining a pitch angle of the lowermost smaller region $h_0$ is the same as or similar to the description of an operation of obtaining a pitch angle in FIG. 5A, and thus, is omitted.

In operation S320, the ISP 120 may set a height, from which the lowermost smaller region $h_0$ starts, to 0 and may calculate a vertical height at which the lowermost smaller region $h_0$ ends.

According to some example embodiments, by using Equations 2 and 4, the ISP 120 may obtain a Z' value in a road coordinate, and additionally based on a correlation between the Z' value in the road coordinate and a Z value in a world coordinate, the ISP 120 may obtain a Z value of an arbitrary smaller region, namely, may obtain a variation of a vertical height in the arbitrary smaller region. The variation of the vertical height may be expressed as the following Equation 7.

$$Z_i(h; \theta_i) = h \cdot \left\{ \frac{(f_Y - (v - c_Y) \cdot \theta_i) \cdot \sin\theta_i}{f_Y \cdot \theta_i + (v - c_Y)} - \cos\theta_i \right\} + H_C \quad \text{[Equation 7]}$$

In an embodiment, Hc may denote a height parameter of the camera 110 and may correspond to a vertical height of the camera 110 in a world coordinate.

Referring to FIG. 4, a point from which a lowermost smaller region starts may include second coordinates ($u_2$, $v_2$) and fourth coordinates ($u_4$, $v_4$), and a point at which a lowermost smaller region ends may include first coordinates ($u_1$, $v_1$) and third coordinates ($u_3$, $v_3$). This is because, in a case where the host vehicle 200 drives along a lane, the host vehicle 200 first passes through the point including the second coordinates ($u_2$, $v_2$) and the fourth coordinates ($u_4$, $v_4$) and later passes through the point including the first coordinates ($u_1$, $v_1$) and the third coordinates ($u_3$, $v_3$).

That is, a line passing through the second coordinates ($u_2$, $v_2$) and the fourth coordinates ($u_4$, $v_4$) may be assumed to be a first line 710, and a line passing through the first coordinates ($u_1$, $v_1$) and the third coordinates ($u_3$, $v_3$) may be assumed to be a second line 720. The point from which the lowermost smaller region starts may correspond to the first line 710, and the point at which the lowermost smaller region ends may correspond to the second line 720.

As described above, the first line 710 may be a point which is sufficiently close to the host vehicle 200, and thus, a vertical height may not vary with respect to the host vehicle 200. That is, Z values of the second coordinates ($u_2$, $v_2$) and the fourth coordinates ($u_4$, $v_4$) each included in the first line 710 may be assumed to be 0. Based on a feature where the Z value of the lowermost smaller region is 0 (e.g., i=0) in Equation 7, a height of the camera 110 in a road coordinate for the lowermost smaller region may be expressed as the following Equation 8.

$$h_0 = -H_C \Big/ \Big\{ \frac{(f_Y - (v - c_Y) \cdot \theta_i) \cdot \sin\theta_i}{f_Y \cdot \theta_i + (v + c_Y)} - \cos\theta_i \Big\} \quad \text{[Equation 8]}$$

According to some example embodiments, a plurality of smaller regions adjacent to one another in a vertical direction may be continuous. This is because a smaller region $h_1$, which is upward adjacent to the lowermost smaller region $h_0$ divided from the forward image, forms one forward road, and the forward road is continuous. That is, the continuity of the forward road may be expressed as the following Equation 9.

$$Z_{i+1}(h_i;\theta_i) = Z_{i+1}(h_{i+1};\theta_{i+1}) \forall i=0,\ldots,N-1 \quad \text{[Equation 9]}$$

That is, by substituting Equations 7 and 8 into Equation 9, a vertical height corresponding to arbitrary smaller regions may be obtained and may be expressed as the following Equation 10.

$$h_{i+1} = \quad \text{[Equation 10]}$$
$$(Z_{i+1}(h_i;\theta_i) - H_C) \Big/ \Big\{ \frac{(f_Y - (v - c_Y) \cdot \theta_i) \cdot \sin\theta_i}{f_Y \cdot \theta_i + (v - c_Y)} - \cos\theta_i \Big\}$$

According to some example embodiments, conversion between a road coordinate and a world coordinate may be performed, and this may be expressed as the following Equation 11.

$$\begin{bmatrix} X \\ Y \\ Z \end{bmatrix} = \begin{bmatrix} \cos\theta & 0 & -\sin\theta \\ 0 & 1 & 0 \\ \sin\theta & 0 & \cos\theta \end{bmatrix} \cdot \begin{bmatrix} X' \\ Y' \\ Z' \end{bmatrix} + \begin{bmatrix} h \cdot \sin\theta \\ 0 \\ -(h \cdot \cos\theta - H_C) \end{bmatrix} \quad \text{[Equation 11]}$$

Referring to Equation 11, a Z value of a point at which an arbitrary smaller region ends may be checked based on a Z value of a start point of the arbitrary smaller region, a height of the camera 110 in the world coordinate, and a pitch angle of the arbitrary smaller region. That is, a vertical height, which is a Z-value variation of the arbitrary smaller region, may be calculated. For example, by substituting i=0, a Z-value variation of the lowermost smaller region $h_0$ of the forward image may be obtained.

In operation S330, the ISP 120 may sequentially calculate vertical heights of a plurality of smaller regions based on continuity between vertically adjacent smaller regions.

Figure 7B:
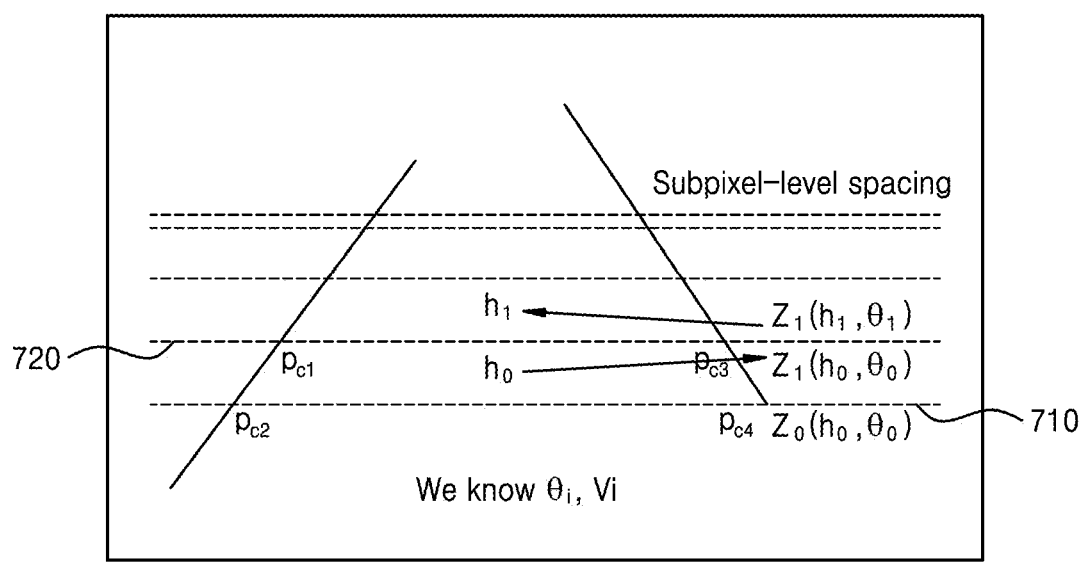
FIG. 7B illustrates an example of continuity between adjacent smaller regions, according to example embodiments.
Figure 7C:
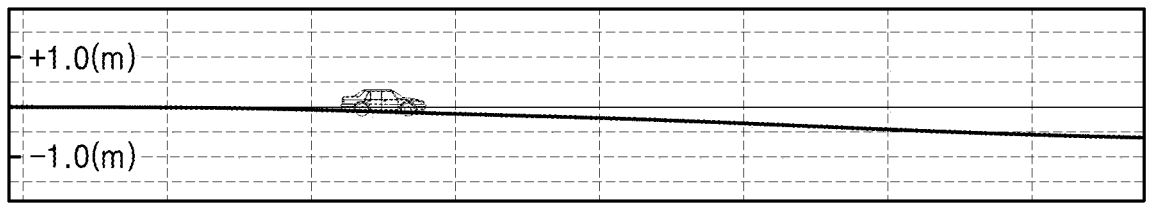
FIG. 7C illustrates an example of a vertical road profile, according to example embodiments.
Figure 7D:
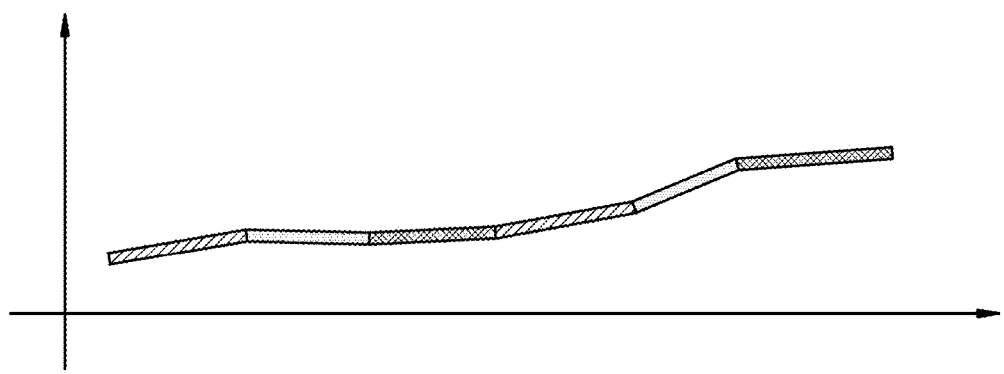
FIG. 7D illustrates an example where vertical heights of smaller regions are calculated sequentially from a lower end of a forward image, according to example embodiments.
Figure 7D:
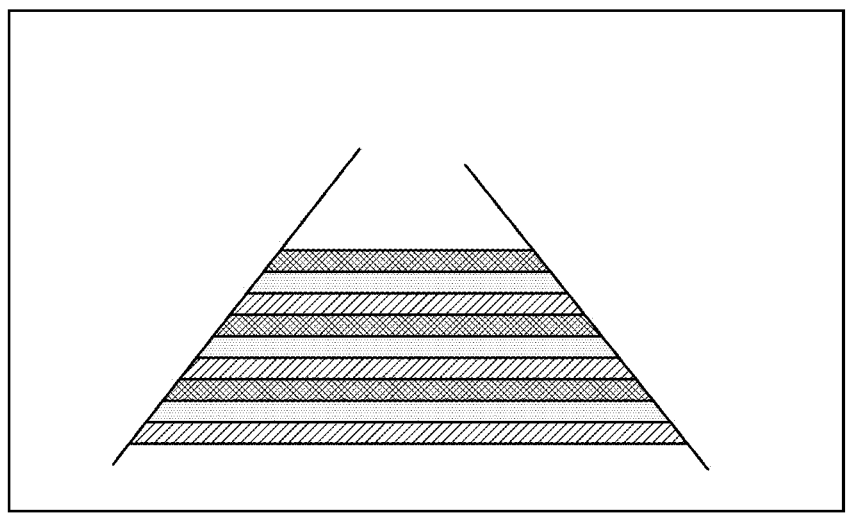

Referring to FIGS. 7B and 7D, a Z value of a point at which a first smaller region $h_0$ ends may be the same as a Z value of a point from which a second smaller region $h_1$ starts. As described above, this is because a height of a forward road is continuous. For example, a concave-convex portion may be on the forward road, and due to this, a Z value may increase suddenly. That is, even when the Z value is rapidly changed due to the concave-convex portion, the ISP 120 may very finely divide an image into a plurality of smaller regions, and thus, Z values of vertically adjacent smaller regions may be the same.

The ISP 120 may sequentially calculate Z-value variations of smaller regions in a direction toward an upper portion from the lowermost smaller region $h_0$. As described above, a Z-value variation of the first smaller region $h_0$ may be set to a Z value of a start point of the second smaller region $h_1$. The ISP 120 may calculate a Z value of a point at which the second smaller region $h_1$ ends, based on a pitch angle of the second smaller region $h_1$ and may set the calculated Z value to a Z value of a start point of the second smaller region of a third smaller region (not shown). The third smaller region (not shown) may denote a region which is upward adjacent to the second smaller region $h_1$. The ISP 120 may repeat the calculation up to an uppermost smaller region of the forward image to calculate a variation of a vertical height.

In operation S340, the ISP 120 may generate a vertical road profile in which the variation of the vertical height is reflected a front view from the host vehicle 200, based on the calculated Z-value variations.

Referring to FIG. 7C, the ISP 120 may generate the vertical road profile. The abscissa axis may be the same as a driving direction of the host vehicle 200. The ordinate axis may denote a variation of a vertical height with respect to the host vehicle 200. The ISP 120 may sequentially obtain Z-value variations of a plurality of smaller regions up to an upper end of the forward image from a lower end of the forward image, and in the vertical road profile, as the host vehicle 200 drives along the abscissa axis, the ordinate axis may be displayed by summating the Z-value variations.

Figure 8:
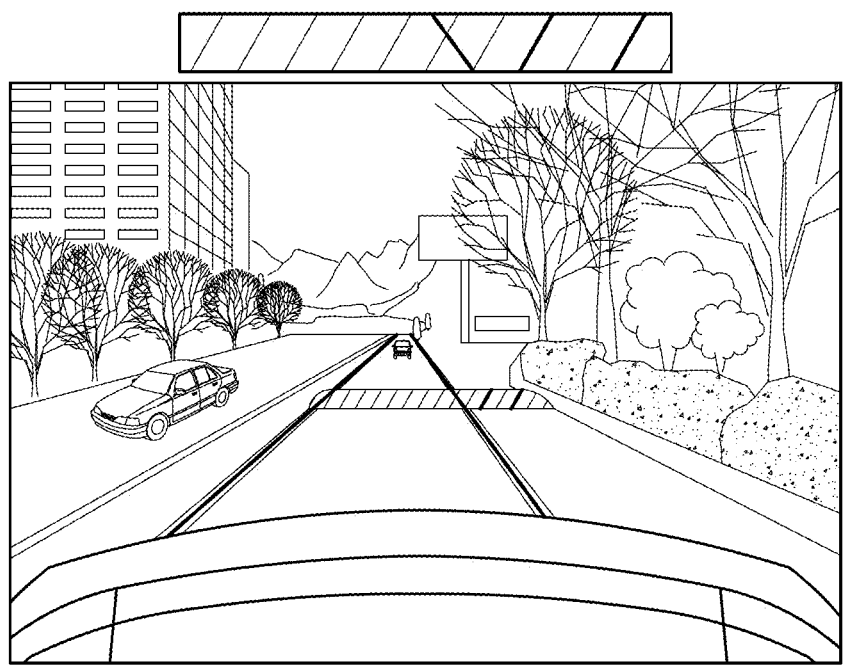
FIG. 8 illustrates an example embodiment which detects a vertical height of a speed bump according to example embodiments.
Figure 8:
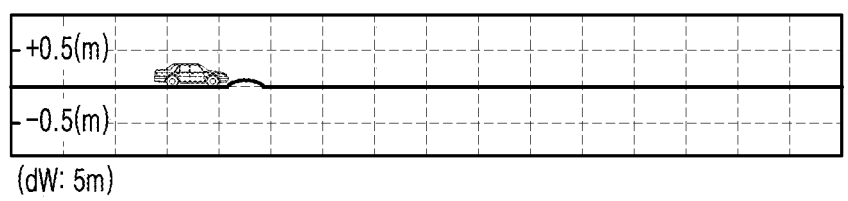

FIG. 8 illustrates an example embodiment which detects a vertical height of a speed bump according to example embodiments.

Referring to FIG. 8, according to example embodiments, the ISP 120 may identify a speed bump which is disposed in a front view. The ISP 120 may detect a lane based on a forward image transferred from the camera 110. The speed bump in front of the host vehicle 200 may include a shape corresponding to a direction which differs from a lane along which the host vehicle 200 is driving. That is, when the lane detection algorithm is used, the ISP 120 may detect a short-length lane facing a direction which differs from a driving lane, due to a different-direction shape printed in the speed bump. When a lane facing a different direction is detected from a forward image, the ISP 120 may determine that the speed bump is in the front view.

In example embodiments described above, it has been described that a speed bump is identified based on a different-direction lane being detected, but the inventive concepts are not limited thereto. The ISP 120 may more quickly identify the speed bump by using an object detection algorithm of a neural network IP.

According to example embodiments, the ISP 120 may generate a vertical road profile corresponding to the forward image. As described above, the ISP 120 may divide the forward image into a plurality of smaller regions in a horizontal direction and may calculate a pitch angle and a variation of a Z value in a direction toward an upper end from a lowermost smaller region of the forward image. For example, in a smaller region corresponding to the speed bump, the ISP 120 may calculate a pitch angle and a variation of a Z value based on a lane segment generated based on a pattern printed in the speed bump, without being based on a lane segment where the host vehicle 200 is driving. This is because, in a case where calculation is performed based on a lane segment where the host vehicle 200 is driving, a variation of a vertical height based on the speed bump is not reflected in the vertical road profile.

According to some example embodiments, the ISP 120 may more precisely divide a plurality of smaller regions corresponding to the identified speed bump in a horizontal direction. For example, assuming that the ISP 120 divides the forward image in the horizontal direction at every 5 of a vertical pixel length, the ISP 120 may divide a region corresponding to the speed bump at every 1 of the vertical pixel length. The ISP 120 may decrease an internal of the vertical pixel length in only a region including a different-direction lane, and thus, may more precisely divide a region corresponding to the speed bump.

In example embodiments, the ISP 120 may generate the vertical road profile based on a Z-value variation of each of a plurality of smaller regions included in the forward image. In regions, corresponding to the speed bump, of a forward region of the vertical road profile, the ISP 120 may use a Z-value variation calculated based on the lane segment generated based on the pattern printed in the speed bump.

Figure 9:
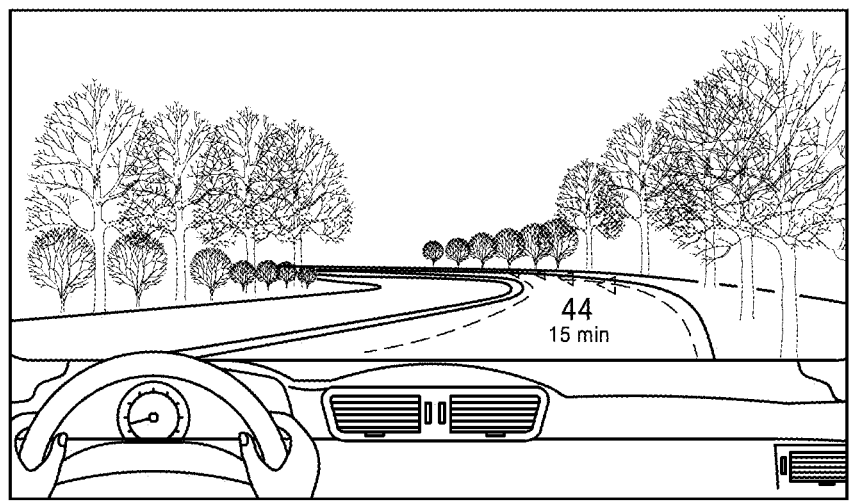
FIG. 9 illustrates an example embodiment which uses a head up display (HUD) according to example embodiments.
Figure 9:
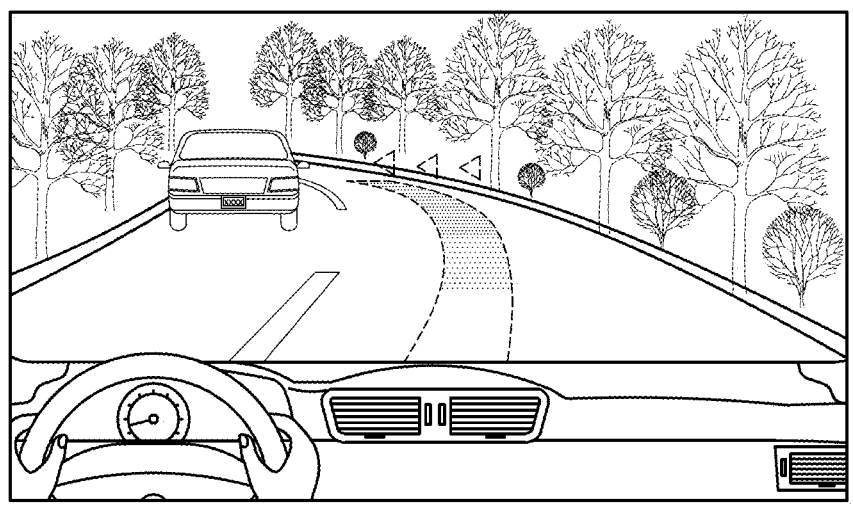

FIG. 9 illustrates an example embodiment which uses a head up display (HUD) according to example embodiments.

Referring to FIG. 9, the host vehicle 200 may further include an HUD (not shown). The HUD may be a device which displays a driving lane and additional information such as a driving speed of the host vehicle 200 on a front window of the host vehicle 200.

According to example embodiments, the ISP 120 may generate information about a virtual lane. The virtual lane may indicate a forward road with respect to the host vehicle 200 by using the HUD. For example, the ISP 120 may generate information about a lane which is parallel to a lane illustrated in the bird's-eye view of FIG. 4 and where a width thereof is narrow in a Y'-axis direction.

According to example embodiments, the ISP 120 may reflect a vertical road profile in the generated information about the virtual lane. That is, the lane illustrated in the bird's-eye view of FIG. 4 may be a lane in a road coordinate where a Z value is 0, and thus, the ISP 120 may generate coordinate values of a world coordinate of a lane in the virtual lane, based on the vertical road profile including information about a variation of a Z value.

According to example embodiments, the ISP 120 may calculate a coordinate value corresponding to an image plane of the virtual lane based on a conversion relationship of Equation 11. Subsequently, the HUD may display the virtual lane based on the coordinate value corresponding to the image plane. For example, the virtual lane may include information about a Z-value variation of the vertical road profile, and thus, despite an uneven portion of a forward road, the HUD may actually display the uneven portion. Therefore, a driver of the host vehicle 200 may previously recognize information about a concave-convex portion and a speed bump of a forward road.

Figure 10:
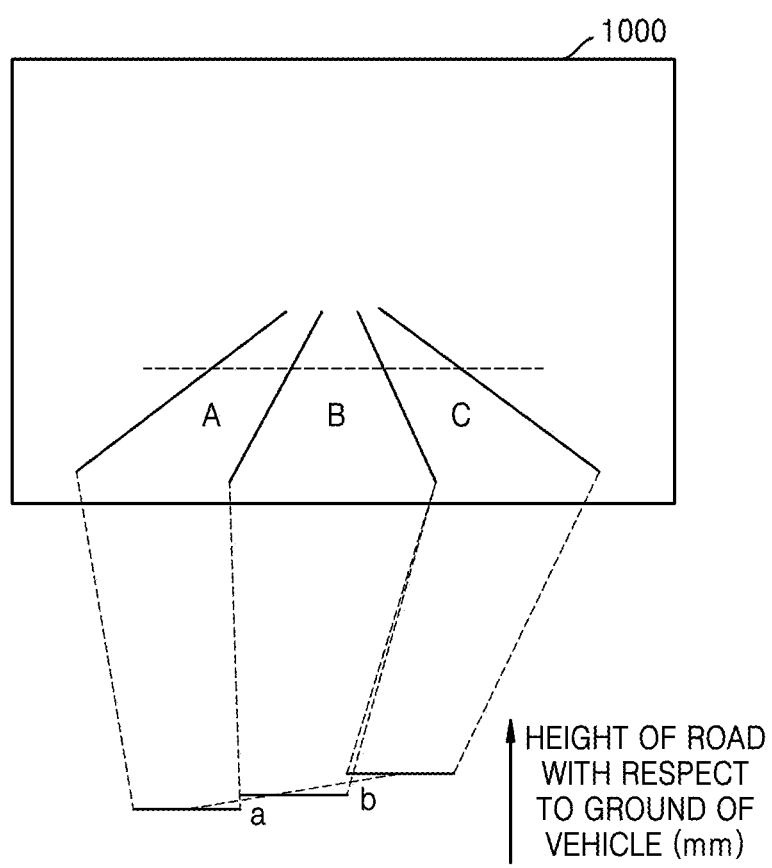
FIG. 10 illustrates an example embodiment which measures a roll of a forward road, according to example embodiments.

FIG. 10 illustrates an example embodiment which measures a roll of a forward road, according to example embodiments.

Referring to FIG. 10, a forward image 1000 may include an image including a plurality of lanes. Hereinafter, for convenience of description, a lane B along which the host vehicle 200 is driving may be referred to as a second lane, a lane A to the left of the second lane may be referred to as a first lane, and a lane C to the right of the second lane may be referred to as a third lane.

According to example embodiments, the ISP 120 may calculate Z-value variations of the first to third lanes. That is, the ISP 120 may divide a forward image including the first to third lanes into a plurality of smaller regions in a horizontal direction. Subsequently, the ISP 120 may detect a lane segment from arbitrary smaller regions of each of the first to third lanes and may detect a variation of a Z value based on four coordinate values forming the lane segment.

For example, in the arbitrary smaller regions, a Z-value variation of the first lane may be −10 mm, a Z-value variation of the second lane may be 10 mm, and a Z-value variation of the third lane may be 20 mm. The ISP 120 may calculate a roll angle of a forward road based on the Z-value variation of each of the first to third lanes. According to example embodiments, the ISP 120 may calculate the roll angle of the forward road based on the Z-value variation of each of the first and third lanes. That is, the ISP 120 may calculate the roll angle of the forward road based on 30 mm, which is a vertical height difference between a left region and a right region of the forward road. According to example embodiments, the ISP 120 may calculate a first roll angle and a second roll angle, and based thereon, the ISP 120 may calculate the roll angle of the forward road. The first roll angle may be determined based on a vertical height difference between the first lane and the second lane, and the second roll angle may be determined based on a vertical height difference between the second lane and the third lane. The ISP 120 may obtain each of the first roll angle and the second roll angle and may determine an average value of the first roll angle and the second roll angle as the roll angle of the forward road.

While the inventive concepts have been particularly shown and described with reference to example embodiments thereof, it will be understood that various changes in form and details may be made therein without departing from the spirit and scope of the following claims.

What is claimed is:

1. An operating method of a slope estimating apparatus including at least one camera, the operating method comprising:
obtaining a forward image through the at least one camera;
detecting a lane included in the forward image;
dividing the forward image into a plurality of smaller regions in a horizontal direction;
identifying a plurality of lane segments included in each of the plurality of smaller regions;

obtaining a plurality of coordinate values forming each of the plurality of lane segments;

obtaining a pitch angle of each of the plurality of smaller regions based on the obtained plurality of coordinate values;

calculating each of camera heights corresponding to the plurality of smaller regions in a road coordinate based on each of the plurality of smaller regions, based on pitch angles of the plurality of smaller regions; and converting each of the plurality of coordinate values of the forward image into a world coordinate value of a world coordinate based on the calculated camera heights and the obtained pitch angles.

2. The operating method of claim 1, further comprising:

identifying a plurality of smaller regions from a lower end of the forward image;

identifying a lane segment included in each of the plurality of smaller regions;

obtaining a pitch angle corresponding to each of the plurality of smaller regions based on a plurality of coordinate values forming the identified lane segment; and setting the obtained pitch angle to a pitch angle of a host vehicle including the slope estimating apparatus.

3. The operating method of claim 1, further comprising generating a road profile based on variations of vertical components of the world coordinate value.

4. The operating method of claim 3, wherein the forward image comprises an image corresponding to a plurality of lanes, and the operating method comprises:

obtaining world coordinate values of the plurality of lanes;

obtaining a variation of a vertical component of one of the plurality of smaller regions; and calculating a roll angle of a forward road based on a variation of a vertical component of each of the plurality of lanes.

5. The operating method of claim 3, further comprising:

detecting a different-direction lane in the forward image with respect to a lane where a host vehicle is driving;

determining that a speed bump is in a region corresponding to the different-direction lane;

obtaining world coordinate values based on the different-direction lane; and determining a vertical height of a region corresponding to the speed bump based on a world coordinate value obtained based on the different-direction lane.

6. The operating method of claim 1, wherein the plurality of smaller regions include pixels arranged in a plane including a vertical direction and the horizontal direction, and vertical pixel lengths of the plurality of smaller regions are the same, the vertical pixel lengths being length of pixels extending in the vertical direction.

7. The operating method of claim 1, wherein the plurality of smaller regions include pixels arranged in a plane including a vertical direction and the horizontal direction, vertical pixel lengths of the plurality of smaller regions are set to be different based on a speed of a host vehicle including the slope estimating apparatus, the vertical pixel lengths being length of pixels extending in the vertical direction, and the operating method further comprising determining whether the speed of the host vehicle is greater than a threshold speed, and in response to the speed of the host vehicle is greater than the threshold speed, decreasing the vertical pixel length dividing an upper region of the forward image.

8. The operating method of claim 1, further comprising:

controlling, using a vehicle controller, strength of a suspension and/or a speed of a host vehicle including the slope estimating apparatus based on the coordinate value of the world coordinate.

9. A slope estimating apparatus comprising:

at least one camera configured to obtain a forward image where a host vehicle including the slope estimating apparatus is driving; and an image signal processor configured to detect a lane included in the forward image, divide the forward image into a plurality of smaller regions in a horizontal direction, identify a plurality of lane segments included in each of the plurality of smaller regions, obtain a plurality of coordinate values forming each of the plurality of lane segments, and obtain a pitch angle of each of the plurality of smaller regions based on the obtained plurality of coordinate values, calculate each of camera heights corresponding to the plurality of smaller regions in a road coordinate based on each of the plurality of smaller regions, based on pitch angles of the plurality of smaller regions, the image signal processor is configured to convert each of the plurality of coordinate values of the forward image into a world coordinate value of a world coordinate based on the calculated camera heights and the obtained pitch angles, generate a virtual lane to be parallel to the detected lane based on the world coordinate values, convert coordinates of the virtual lane into coordinate values of an image coordinate based on a conversion relationship of the forward image and the world coordinate.

10. The slope estimating apparatus of claim 9, wherein the image signal processor is configured to identify a plurality of smaller regions from a lower end of the forward image, identify a lane segment included in each of the plurality of smaller regions, obtain a pitch angle corresponding to each of the plurality of smaller regions based on a plurality of coordinate values forming the identified lane segment, and set the obtained pitch angle to a pitch angle of the host vehicle including the slope estimating apparatus.

11. The slope estimating apparatus of claim 9, wherein the image signal processor is configured to generate a road profile based on variations of vertical components of the world coordinate value.

12. The slope estimating apparatus of claim 11, wherein the forward image comprises an image corresponding to a plurality of lanes, and the image signal processor is configured to obtain world coordinate values of the plurality of lanes, obtain a variation of a vertical component of one of the plurality of smaller regions, and calculate a roll angle of a forward road based on a variation of a vertical component of each of the plurality of lanes.

13. The slope estimating apparatus of claim 11, wherein the image signal processor is configured to detect a different-direction lane in the forward image with respect to the lane where the host vehicle is driving, determine that a speed bump is in a region corresponding to the different-direction lane, obtain world coordinate values based on the different-direction lane, and determine a vertical height of a region corresponding to the speed bump based on a world coordinate value obtained based on the different-direction lane.

14. The slope estimating apparatus of claim 9, wherein the plurality of smaller regions include pixels arranged in a plane including a vertical direction and the horizontal direction, and
vertical pixel lengths of the plurality of smaller regions are the same, the vertical pixel lengths being length of pixels extending in the vertical direction.

15. The slope estimating apparatus of claim 9, wherein the plurality of smaller regions include pixels arranged in a plane including a vertical direction and the horizontal direction,
vertical pixel lengths of the plurality of smaller regions are set to be different based on a speed of the host vehicle including the slope estimating apparatus, the vertical pixel lengths being length of pixels extending in the vertical direction, and
wherein the image signal processor is configured to determine whether the speed of the host vehicle is greater than a threshold speed, and when the speed of the host vehicle is greater than the threshold speed, decrease the vertical pixel length dividing an upper region of the forward image.

16. The slope estimating apparatus of claim 9, wherein the image signal processor is further configured to display the virtual lane by using a head up display (HUD) based on the coordinate values of the image coordinate.

17. A host vehicle apparatus comprising:
at least one camera configured to obtain a forward image where a host vehicle is driving;
an image signal processor configured to detect a lane included in the forward image, divide the forward image into a plurality of smaller regions in a horizontal direction, identify a plurality of lane segments included in each of the plurality of smaller regions, obtain a plurality of coordinate values forming each of the plurality of lane segments, obtain a pitch angle of each of the plurality of smaller regions based on the obtained plurality of coordinate values, identify a plurality of smaller regions from a lower end of the forward image, identify a lane segment included in each of the plurality of smaller regions, obtain a pitch angle corresponding to each of the plurality of smaller regions based on a plurality of coordinate values forming the identified lane segment, and convert coordinates of the forward image into a coordinate value of a world coordinate based on the obtained pitch angle; and
a vehicle controller configured to control strength of a suspension and/or a speed of the host vehicle based on the coordinate value of the world coordinate.

* * * * *